United States Patent [19]

Fletcher et al.

[11] 3,900,741

[45] Aug. 19, 1975

[54] FAULT TOLERANT CLOCK APPARATUS UTILIZING A CONTROLLED MINORITY OF CLOCK ELEMENTS

[76] Inventors: James C. Fletcher, Administrator of the National Aeronautics and Space Administration with respect to an invention of; William M. Daly, West Newton; John F. McKenna, Jr., Gloucester, both of Mass.

[22] Filed: Apr. 26, 1973

[21] Appl. No.: 354,612

[52] U.S. Cl. ................ 307/204; 307/211; 307/219; 328/61; 328/62

[51] Int. Cl.² ..................... H02K 19/08; H03K 19/42; G06F 11/08

[58] Field of Search ...... 307/204, 211, 219; 328/60, 328/61, 62, 63

[56] References Cited

UNITED STATES PATENTS

| | | | |
|---|---|---|---|
| 2,910,584 | 10/1959 | Steele | 307/219 |
| 3,278,852 | 10/1966 | Mann | 307/211 |
| 3,283,172 | 11/1966 | Masters, Jr. | 307/219 |
| 3,305,735 | 2/1967 | Moreines | 307/219 |
| 3,335,403 | 8/1967 | Mann et al. | 307/204 |
| 3,524,073 | 8/1970 | Tobin | 307/211 |
| 3,564,448 | 2/1971 | Watkins | 307/219 |
| 3,619,661 | 11/1971 | Butler, Jr. et al. | 328/63 |
| 3,737,674 | 6/1973 | Butler, Jr. | 307/211 |

*Primary Examiner*—Stanley D. Miller, Jr.
*Attorney, Agent, or Firm*—Marvin J. Marnock; John R. Manning; Marvin F. Matthews

[57] ABSTRACT

A fault-tolerant clock apparatus, insensitive to occurrence of faults or failures in components thereof, providing an output clock pulse for use in fault-tolerant digital computers and the like.

5 Claims, 6 Drawing Figures

FAULT TOLERANT CLOCK APPARATUS UTILIZING A CONTROLLED MINORITY OF CLOCK ELEMENTS

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 45 U.S.C. 2457).

BACKGROUND OF THE INVENTION

1. Field Of The Invention

The present invention relates to fault-tolerant clocks or oscillators for forming timing and reference signals.

2. Description Of The Prior Art

In the prior art, such as U.S. Pat. No. 3,479,603, certain timing sources were redundantly interconnected in a manner so that as long as self-testing circuits determined that one of the sources was operative, a timing pulse output was furnished.

Other prior art, such as U.S. Pat. No. 3,278,852, relied on a majority decision among redundant sources as to the correct timing pulse output. However, when these sources failed, they typically failed in one of their two logic levels or states. Unless the remaining operative sources were accurately synchronized to an accurate timing reference, their outputs would differ. One of the two groups of the operative sources, having a logic level like that of the failed sources, would then cause an erroneous output pulse to be formed, controlled by the logic level of the failed sources.

Another prior art approach has been to detect, isolate, and correct faults as they occur, but this required that all failure modes of an apparatus be determined during design, making this approach complex and expensive.

SUMMARY OF THE INVENTION

Briefly, the present invention provides a new and improved fault-tolerant clock apparatus which provides a clock signal despite failure of individual clock elements therein. A quorum logic circuit forms a control signal in response to transitions in output signals from a controlling minority of the individual clock elements, and furnishes this control signal to an output circuit which forms the clock signal in response to the control signal.

With the present invention, in a clock apparatus tolerant of $r$ faults having $3r + 1$ clock elements, $r$ being any positive integer, a controlling minority comprises any $r + 1$ clock elements. The quorum logic circuit thus forms the control signal to activate the output circuit in response to a transition, or change in digital logic level, of a controlling minority of any $r + 1$ of the $3r + 1$ clock elements so that the output clock signal is formed notwithstanding failure of any $r$ clock elements in the apparatus.

The apparatus is further provided with circuitry for initializing the clock elements to the proper status when the apparatus is initially started, and a differentiator which forms an impulse from the control signal in order to assure accurate operation of the output circuit.

It is an object of the present invention to provide a new and improved fault-tolerant clock apparatus.

DESCRIPTION OF PREFERRED EMBODIMENT

Figures 1, 2A:
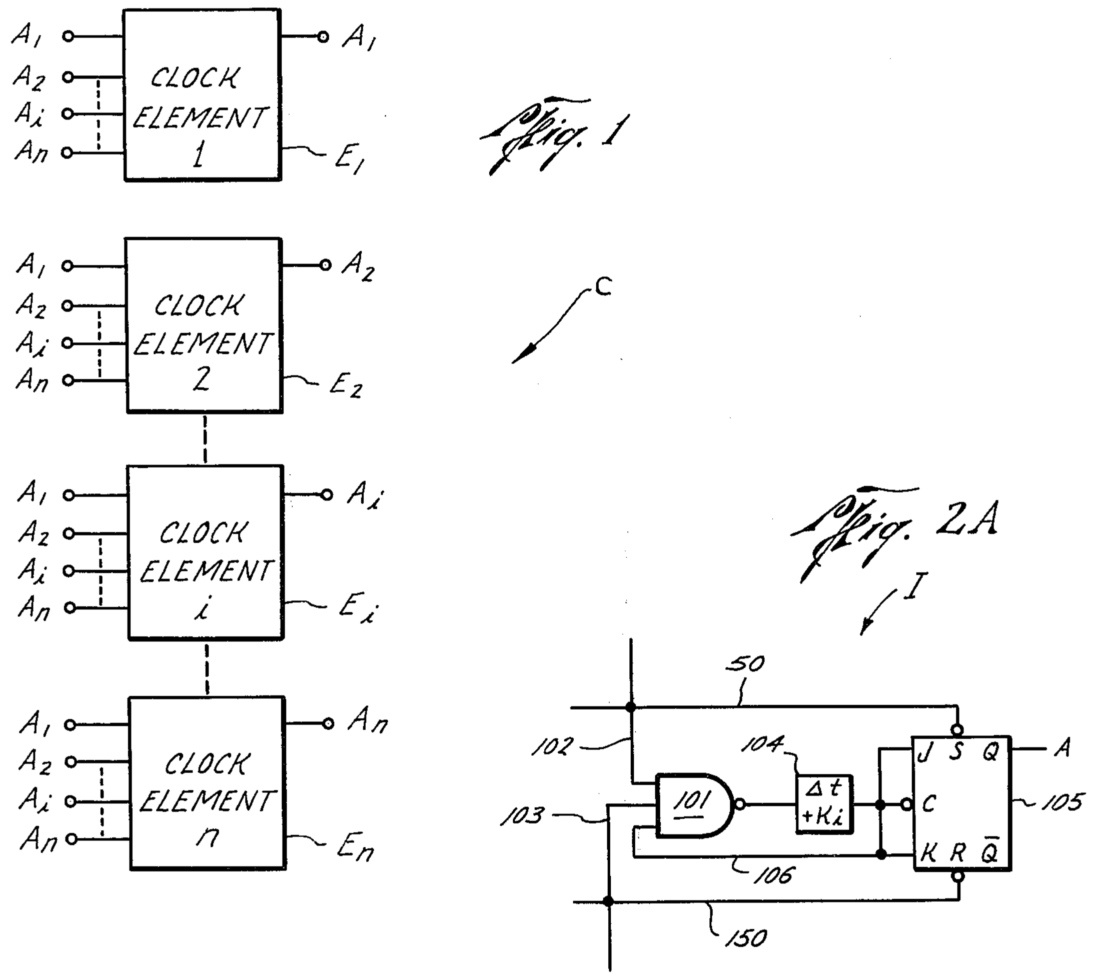
FIG. 1 is a schematic circuit diagram of the apparatus of the present invention.
FIGS. 2A and 2B are schematic electrical circuit diagrams of alternative circuits for initializing the clock element of FIG. 2.

In the drawings, the letter C designates generally the clock apparatus of the present invention including a plurality of individual clock elements E therein. The clock apparatus C is fault-tolerant in that it provides a clock signal despite failure of individual clock elements E therein. In the accompanying drawings, individual clock elements $E_1, E_2, \ldots E_i \ldots E_n$ are set forth. Each of these clock elements $E_1$ through $E_n$ forms an output clock signal $A_1$ through $A_n$, respectively. Each of these clock elements $E_1$ through $E_n$ further receives as an input signal the output signals A from each of the other clock elements E, as well as its own output signal. These output signals, as will be set forth, are digital signals, having the conventional logic levels of 1 and 0.

The apparatus C forms these output clock signals notwithstanding the failure of a predetermined number of the individual clock elements E therein, as will be set forth below, so that the clock signal may be furnished to an electronic apparatus requiring a timing signal and tolerant of faults. Such applications include digital computers whose failure might cause a critical situation, such as a computer-controlled nuclear reactor, or in situations where it is difficult to repair a faulty computer, such as a space borne computer.

Figure 2B:
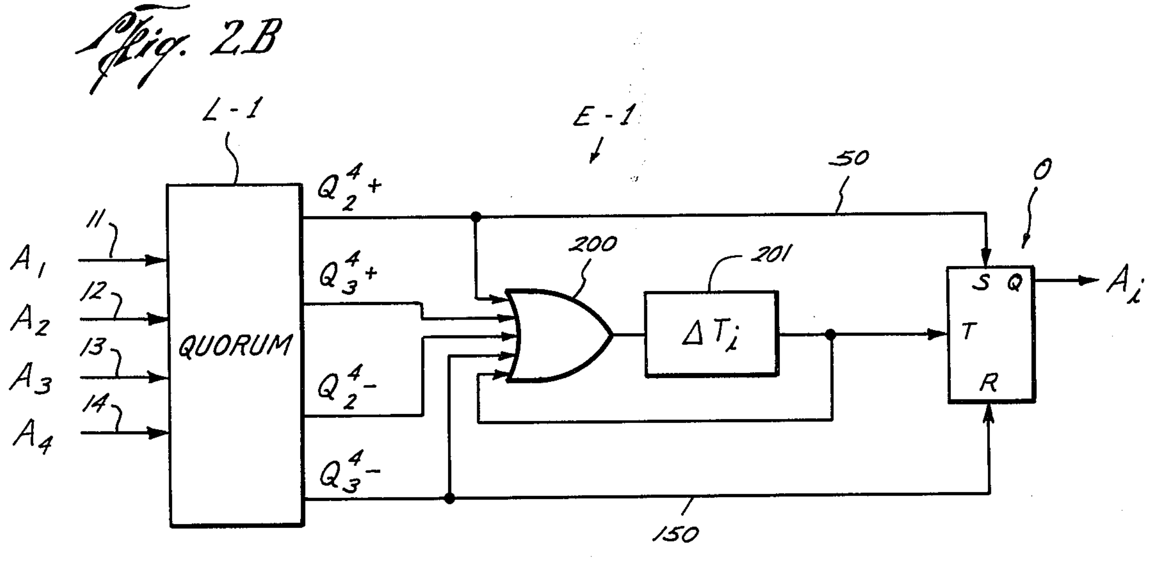
Figure 2:
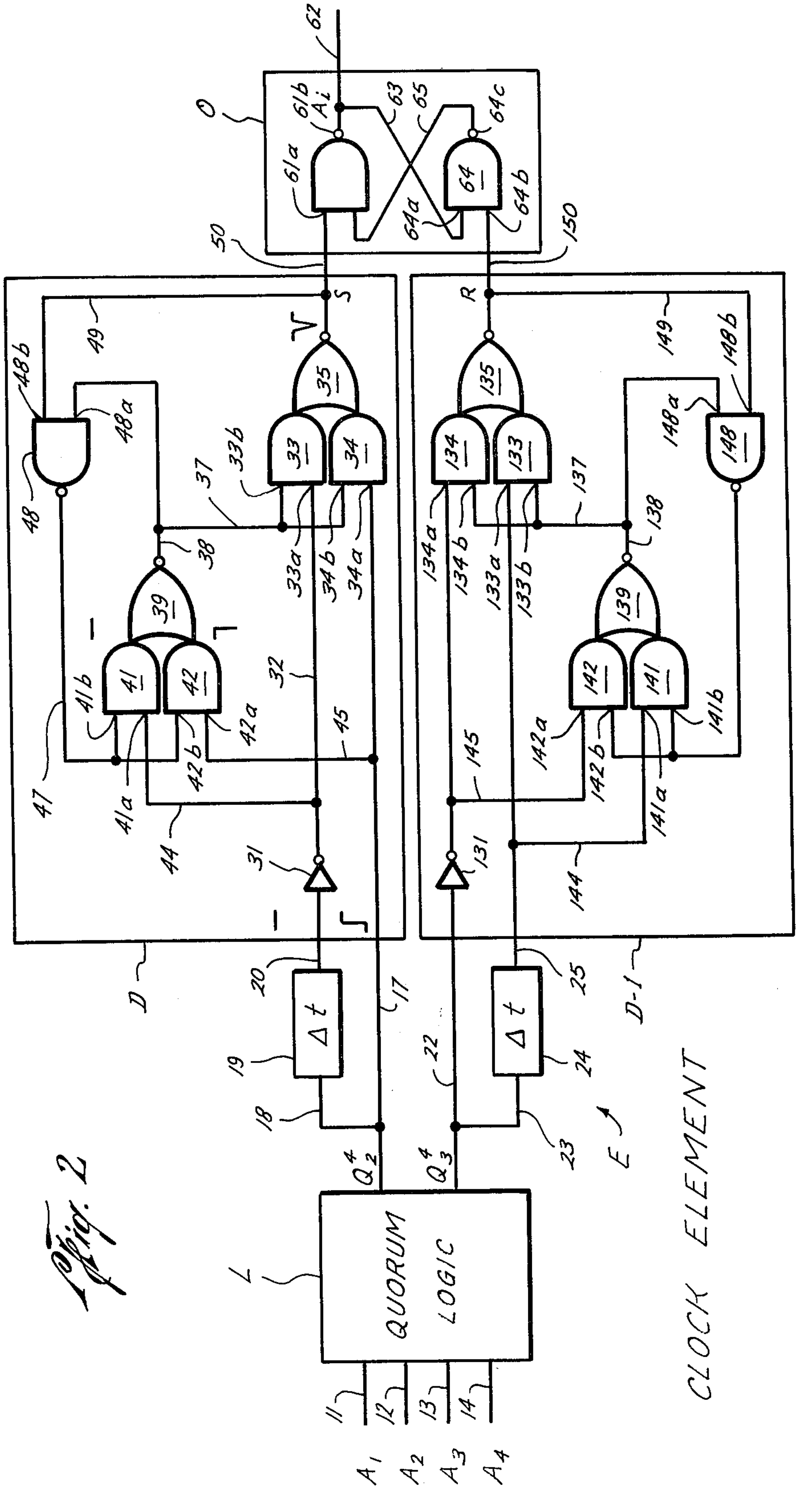
FIG. 2 is a schematic electrical circuit diagram of an individual clock element of the apparatus of FIG. 1.

Considering the clock elements E more in detail, each of the clock elements E (FIG. 2) includes a quorum logic circuit L which forms a control signal responsive to transitions in the signals received from the individual clock elements and an output circuit O which forms the clock signal in response to the control signal from the quorum logic circuit L.

The output circuit O in each of the clock elements E is a bistable digital logic circuit, in the preferred embodiment an R-S flip-flop forming the output digital clock signal A therein in response to the control signal from the quorum logic circuit L. The quorum logic circuit L in the clock elements E forms the control signal in response to transitions in the output signals A of the clock elements E.

The quorum logic circuit L is controlled in its operation by certain quorum functions Q formed therein. A quorum function $Q_i^n$ is defined for the purposes of the present invention to be logic level 1 if at least $i$ of the $n$ output signals $A_1, A_2, \ldots A_n$ are logic levels 1. If less than $i$ of these output signals A are logic level 1, the quorum function $Q_i^n$ is logic level 0.

A quorum change function $Q_i^n+$ is defined for the purposes of the present invention as an indication that the quorum function $Q_i^n$ changes from logic level 0 to logic level 1. The quorum change function $Q_i^n-$ is defined as indicating that the quorum function $Q_i^n$ has changed from logic level 1 to logic level 0.

The quorum logic circuit L forms the control signal in accordance with the quorum function and the quorum change functions set forth above in order to operate the output circuit O to form the output signal at the desired time. The particular quorum function Q used in the clock apparatus C is determined by the number $n$ of clock elements E in the apparatus C, and the number $r$ of failures to be tolerated by the apparatus C before failure. With the present invention, it has been determined that the clock apparatus can be made tolerant of $r$ failures, $r$ being any positive integer, if the quorum logic circuit L forms a control signal setting the output circuit O to a first logic level in response to quorum change functions $Q_x^n+$ and $Q_x^n-$, wherein $x$ is a controlling minority of the $n$ clock elements E, due to transitions in logic level of the controlling minority $x$ of clock elements E. The quorum logic circuit L further forms control signals to reset the output circuit O to a second logic level in response to a quorum change function $Q_y^n-$ and $Q_y^n+$. With the present invention, it has been determined that the values of the controlling minority $x$ for quorum change functions $Q_x^n+$ and $Q_x^n-$, the number $r$ of failures to be tolerated, and the number $n$ of clock elements E are interrelated. A clock apparatus C having $n$ clock elements can be made fault tolerant of the $r$ failures, according to the present invention, so long as the number $n$ of clock elements E exceeds 3 times the number $r$ of faults to be tolerated. Expressed mathematically:

$$n \geqq 3r + 1$$

The controlling minority $x$ of clock element E whose level transitions cause the quorum logic circuit L to form the control signal setting the output circuit O must exceed the number $r$ of failures to be tolerated. Expressed mathematically:

$$x \geqq r + 1$$

In this manner, the failure of $r$ individual clock elements at a logic level 1 cannot cause the quorum function $Q_x^n$ to be a constant logic level 1. This prevents the quorum logic circuit L from continually providing a control signal of logic level 1 in response to failure of $r$ individual clock elements at logic level 1, and thereby allows the output circuit O to alternate between logic levels and provide the desired fault-tolerant digital clock signal.

The number $y$ of clock elements for the quorum change functions $Q_y^n-$ and $Q_y^n+$ must be less than or equal to the number of clock elements $n$ minus the number of failures $r$ to be tolerated. In this manner, the receipt of $r$ input signals of constant logic level 0 from failed clock elements cannot cause the quorum change function $Q_y^n$ to be constant logic level 0. This allows the logic circuit L to periodically reset the output circuit O in response to the quorum change function $Q_y^n-$, and thereby allows the output circuit O to return to logic level 0 periodically after having been set to logic level 1 by the quorum function $Q_x^n$.

The time duration between the periodic changes in logic level of the output circuit O is determined by a time delay circuit D in the clock element E (FIG. 2) as will be set forth below.

The clock element E (FIG. 2) is one of four clock elements in a clock apparatus C tolerant of failure of one clock element, since the number $n$ of clock elements is four. It should be understood that, as has been set forth above, the number of clock elements and the number of failures to be tolerated are interrelated, and that the number of clock elements can be any suitable number, determined in accordance with the number of clock failures to be tolerated.

Considering the clock element E in more detail, the quorum logic circuit L receives the output signals $A_1$, $A_2$, $A_3$ and $A_4$ over input conductors 11, 12, 13 and 14, respectively.

The quorum logic circuit L forms a control signal $Q_2^4$ in response to the state of the quorum function $Q_2^4$, as has been set forth, in response to the levels of the four input signals $A_1$, $A_2$, $A_3$ and $A_4$, respectively, in accordance with the following digital logic equation:

$$Q_2^4 = A_1A_2 + A_1A_3 + A_1A_4 + A_2A_3 + A_2A_4 + A_3A_4$$

This quorum function is furnished to the output logic circuit O, in a manner to be set forth below, to cause the output circuit O to form the clock signal.

The quorum logic circuit L further forms the control signal $Q_3^4$ in response to the state of the quorum function $Q_3^4$, as has been set forth, and provides such control signal to eventually reset the output circuit O. The control signal $Q_3^4$ is formed in accordance with the levels of the four input signals $A_1$, $A_2$, $A_3$, and $A_4$ and in accordance with the following digital logic equation:

$$Q_3^4 = A_1A_2A_3 + A_1A_2A_4 + A_1A_3A_4 + A_2A_3A_4$$

The quorum logic circuit L contains digital logic AND gates as well as OR gates to form the control signals in accordance with the digital logic equation set forth above. Such gates are conventional, and are interconnected in order to form the quorum functions in accordance with the above digital logic equations. Suitable gating circuits and interconnections thereof to form these digital logic equations may easily be designed by one skilled in the art and similar logic circuits are shown in "Boolean Algebra with Computer Applications" by williams, McGraw-Hill, New York, 1970 on pages 55–62, and also in "Digital Computer Basics" NAVPERS 10088, U.S. Government Printing Office, 1968 on pages 47–51.

It should be understood that other gating circuitry to form the control signals in accordance with the equations set forth above are equally suitable in the quorum logic circuit L. The control signal $Q_2^4$ formed by the quorum logic circuit L is furnished over an electrical conductor 17 to a digital differentiator D which forms, in a manner to be set forth below, an impulse signal in response to a transition in the level of the control signal $Q_2^4$. The control signal $Q_2^4$ is further provided to time delay circuit 19. The time delay circuit 19 is a conventional retriggerable monostable multivibrator circuit of any suitable form which responds to the most recent transition in the logic level of the control signal by forming an output pulse of a predetermined time duration and provides such pulse over a conductor 20 to the differentiator D.

The control signal $Q_3^4$ is provided over a conductor 22 to a digital differentiator D–1, of like structure and function to the digital differentiator D. The control signal $Q_3^4$ is further furnished from the conductor 22 over a conductor 23 to a time delay circuit 24 having, for reasons to be set forth below, an output pulse whose time duration is within acceptable tolerance limits of that from the time delay circuit 19. The time delay circuit 24 responds to the most recent transition of the control signal $Q_3^4$ and forms a pulse of predetermined time duration and furnished this pulse over a conductor 25 to the digital differentiator D–1.

The duration of the control signals $Q_2^4$ and $Q_3^4$ formed by the time delay circuits 19 and 24, respectively, determines the frequency of the clock signal from the clock elements E of apparatus A.

The digital differentiator D includes an inverter circuit 31 which inverts the time delayed control signal $Q_2^4$ on the conductor 20 so that the differentiator D furnishes the control signal to the output circuit O to set the output circuit O in response to the quorum change function $Q_2^4+$, or after the time delay of the time delay circuit 19, the quorum change function $Q_2^4-$.

A conductor 32 electrically connects the output of the inverter 31 to an AND gate 33 at an input 33*a* thereof. An AND gate 34 receives the control signal $Q_2^4$ from the conductor 17 at an input terminal 34*a* thereof. The AND gates 33 and 34 furnish their output signals to two input terminals (not shown) of a NOR gate 35.

A conductor 37 electrically connects an input terminal 33*b* of the AND gate 33 and an input terminal 34*b* of the AND gate 34 with an output conductor 38 of a NOR gate 39.

The NOR gate 39 is electrically connected at its two inputs (not shown) to AND gates 41 and 42. An input terminal 41*a* of the AND gate 41 receives the time delayed inverted control signal $Q_2^4$ from the inverter 31 over an input conductor 44. An input terminal 42*a* of the AND gate 42 receives the control signal $Q_2^4$ from the quorum logic circuit L and the conductor 17 over an input conductor 45. A return conductor 47 is electrically connected to an input terminal 41*b* of the AND gate 41 and an input terminal 42*b* of the AND gate 42. The conductor 47 provides the output from a NAND gate 48 to the AND gates 41 and 42.

The NAND gate 48 is electrically connected to the conductor 38 at an input terminal 48*a* thereof in order to receive the output of the NOR gate 39. The NAND gate 48 is further connected at an input terminal 48*b* thereof by a conductor 49 to the output of NOR gate 35.

An output conductor 50 electrically connects the output of the NOR gate 35 to the output circuit O.

The AND gates 42 and 34, together with the NOR gates 35 and 39 and NAND gate 48 of the differentiator D respond to the quorum change function $Q_2^4+$, causing the differentiator D to form a negative going impulse or spike waveform which is furnished over the output conductor 50 to set the output circuit O to a logic 1 level. Further, the AND gates 41 and 33, together with the NOR gates 35 and 39 and NAND gate 48 of the differentiator D respond to the quorum change function $Q_2^4-$, after a predetermined time delay in the time delay network 19, to set the output circuit O to the logic 1 level. Thus, the output signal A from the clock element E is set to the logic 1 level by the quorum change function $Q_2^4+$ formed as a control signal in the quorum logic circuit E, or alternatively after a predetermined time delay in the time delay network 19, by the quorum change function $Q_2^4-$, both formed in response to transitions in the level of a controlling minority of the output signals.

It should be understood that the digital differentiator D is given for the purposes of a preferred embodiment only, and that other digital differentiation circuits are also suitable for use with the present invention.

The digital differentiator circuit D–1 is of like structure to the digital differentiator circuit D and accordingly circuit components and electrical conductors of the differentiator D–1 bear like reference numerals to their counterparts in the differentiator D set forth hereinabove, with the circuit components and the conductors of the differentiator D–1 prefixed by the numeral 1. For example, the NOR gate 139 of the differentiator D–1 is the counterpart of the NOR gate 39 in the differentiator D. The differentiator D–1 forms an impulse or spike signal over the output conductor 150 to the output circuit O to reset the output circuit O to the logic 0 level. The resetting of the output circuit O takes place due to the quorum change functions $Q_3^4-$ and $Q_3^4+$ formed in the logic circuit L. The inverter 131 of the differentiator D–1 is removed from the connection with the time delay circuit 24 and electrically connected between the conductor 22 and the input terminal 134*a* of the AND gate 134 so that the output circuit O is reset by the undelayed quorum change function $Q_3^4-$. Further, since the inverter circuit 131 is not connected to the output of the time delay circuit 24, the output circuit O is alternatively reset by a negative-going spike or impulse signal over the conductor 150 by the time delayed quorum change function $Q_3^4+$ occurring after a predetermined time delay established by the time delay network 24.

The output circuit O includes a first NAND gate 61 electrically connected to the conductor 50 at an input terminal 61*a* thereof. An output terminal 61*b* of the NAND gate 61 in the output circuit O provides the output clock signal A formed by the clock element E over an output conductor 62. The output terminal 61*b* of the NAND gate 61 is further provided over a conductor 63 to a first input terminal 64*a* of a NAND gate 64. The NAND gate 64 is further connected at an input terminal 64*b* to the digital differentiator D–1 over the output conductor 150. An output terminal 64*c* of the NAND gate 64 is electrically connected by a conductor 65 to an input terminal 61*b* of the NAND gate 61. Accordingly, it can be seen that the twin NAND gate 61 and 64 of the output circuit O are electrically interconnected to form an R-S flip-flop which alternates between the logic 1 and logic 0 levels in accordance with alternate receipt of the impulses from the digital differentiators D and D–1 over the conductors 50 and 150, respectively. It should be further understood that other suitable bistable digital logic circuits are equally suitable for use with the present invention, as will be set forth below.

In the embodiment of the fault tolerant clock with the clock element E having three other clock elements of like structure and function, each of the clock elements E provides its output signal to the quorum logic circuit L in the other clock elements and further provides its own output signal A to its own quorum logic circuit L, over conductors not shown for the purposes of clarity in the drawings. The number *n* of clock elements E in the apparatus A is accordingly 4. Thus, in accordance with the present invention, the clock apparatus A is tolerant of a number *r* of one failure. The controlling minority *x* for this embodiment of the present invention is thus 2, less than the majority of 3 of 4, and the remaining function *y* is 3.

The quorum change function $Q_3^4+$ occurs in response to the output circuits of three of the clock elements E being driven to logic level 1 by the quorum function $Q_2^4+$ formed in their logic circuits L. Thus, for a period of time after the output circuits O are set to logic 1, they remain in such state. This period is established by the time delay of the time delay network 24. After this time delay, the time delayed quorum function $Q_3^4+$ resets the output circuits O to logic level 0 through the gates 133 and 135, causing the quorum change function $Q_3^4-$ when two of the output circuits O are reset. The quorum change function $Q_3^4-$ resets the remaining two output circuits O to logic level 0 through the gates 134 and 135, causing the quorum change function $Q_2^4-$ to be formed in the logic circuits L of the clock elements E. The quorum change function $Q_2^4-$ is delayed in the time delay network 19 for a substantially equal time to that of the time delay network 24 before causing the differentiator D to form a pulse setting the output circuit O to logic level 1 again through the gates 33 and 35, causing the quorum function $Q_2^4+$, and the above sequence is repeated.

Thus, the frequency of the clock apparatus A is determined by the time delay in the clock elements 19 and 24 in each of the clock elements E. Since in physical reality, these devices cannot be perfectly calibrated, the actual delay produced by each of the networks in the apparatus A is within some specified limit $\pm e$ of the other delays.

Figures 3, 4:
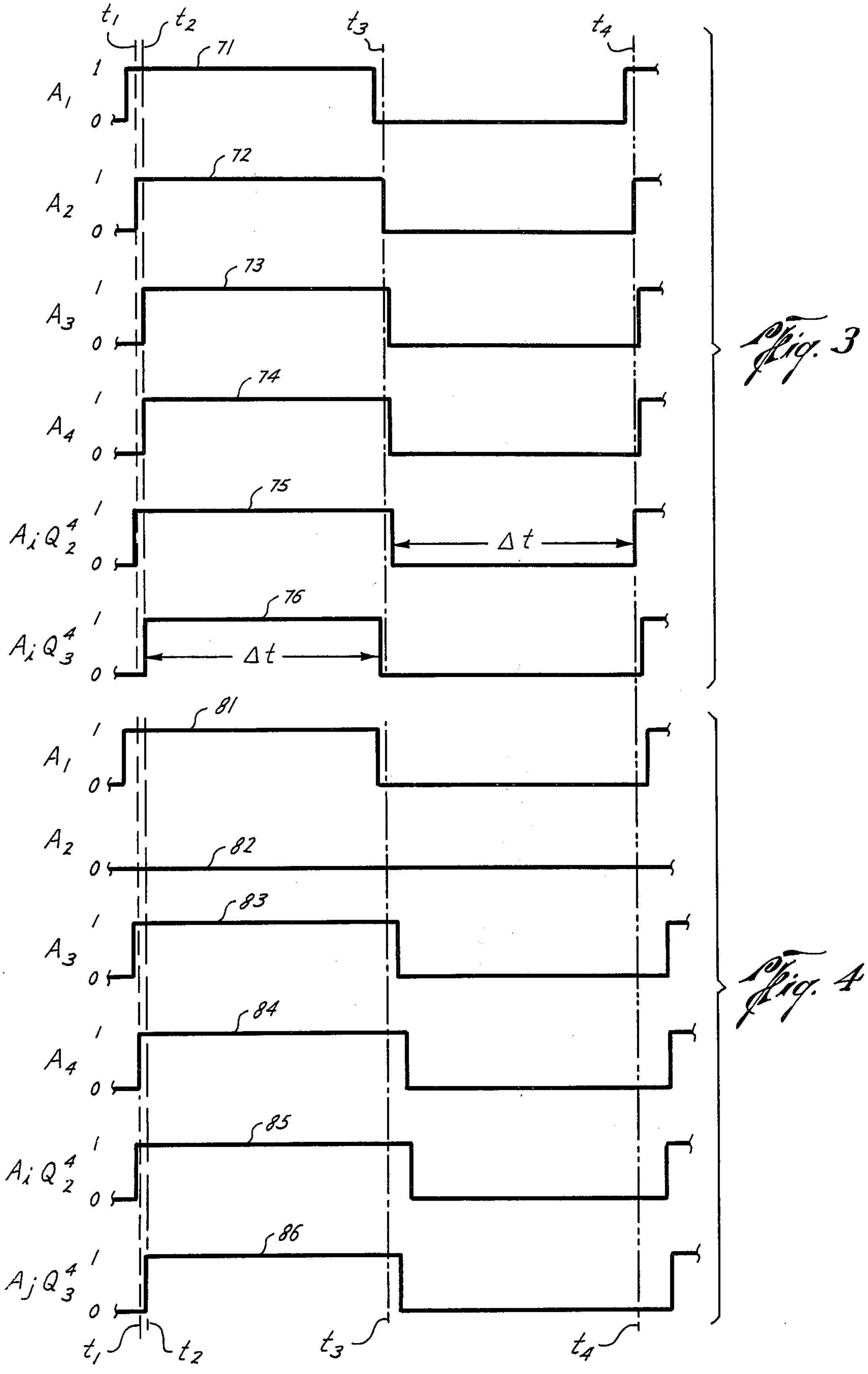
FIGS. 3 and 4 are voltage waveform diagrams occurring in the apparatus of FIG. 1.

Reference is now made to the accompanying drawings (FIG. 3) wherein example waveforms 71, 72, 73 and 74 illustrate output clock signals $A_1$, $A_2$, $A_3$ and $A_4$ respectively, of the apparatus A, with each of the four clock elements in the apparatus A operable. A waveform 75 and a waveform 76 illustrate the control signals $Q_2^4$ and $Q_3^4$ from one of the four clock elements E.

It is to be noted that because of the variance of the time delays between the clock elements, the transitions in logic levels in the waveform 71 through 74 do not occur simultaneously.

At a time $t_1$, the output clock signals $A_1$ and $A_2$ have assumed logic 1 levels, while the clock elements having the output signals $A_3$ and $A_4$ remain at logic 0. Since the controlling minority of two clock elements E now have the logic 1 output, the quorum logic circuit L in each of the clock elements E forms the quorum change function $Q_2^4+$, setting each of the output signals A which are not already in the logic 1 level to the logic 1 level at a time $t_2$. At this time, receipt of three or more of the logic 1 signals over the input conductors 11 through 14 by the quorum logic circuit L causes the quorum change function $Q_3^4+$ to occur. Such signal is transferred to the time delay circuit 24 by the conductor 23 and after the predetermined time delay indicated on the drawings, the differentiator D–1 resets the output circuit O driving the output signal A to logic level 0. As soon as two of the output signals A are reset to logic level 0, at a time $t_3$, the quorum change function $Q_3^4-$ occurs, which causes the remaining two output signals A to be driven to the logic level 0, causing the quorum change function $Q_2^4-$. This quorum change function passes through the time delay circuit 19 and inverter 31 of the differentiator D at a time $t_4$ after the predetermined time delay and is furnished over the output conductor 50 to the output circuit O setting the output signal A to logic level 1 once again. As soon as two of the output signals A are set to logic level 1, the quorum change function $Q_2^4+$ occurs, and the sequence set forth hereinabove repeats.

References now made to the accompanying drawings (FIG. 4) wherein one of the clock elements E has failed, causing the output signal $A_2$, as indicated by waveform 82, to be logic level 0. It should be understood however, that the clock apparatus C is tolerant of other forms of failures, as well. The remaining output signals $A_1$, $A_3$ and $A_4$ are indicated as waveforms 81, 82 and 84, respectively. A waveform 85 indicates the quorum function $Q_2^4$ while a waveform 86 illustrates the quorum function $Q_3^4$. It is to be noted that although one of the clock element waveforms is faulty, being a constant logic level 0, the controlling minority $Q_2^4$ function causes the output circuit O to be set to logic level 1 at predetermined times, and after the predetermined time delay, the quorum logic circuit L forms the quorum function $Q_3^4$ which resets the output circuit O, again permitting the lapse of the predetermined time delay and repeating of the process set forth hereinabove.

In order to assure that the clock apparatus A is properly initialized upon energization thereof, an initializing circuit I initializes the clock element E. The initializing circuit I (FIG. 2A) is connected into the clock element E (FIG. 2), and accordingly like circuit components and conductors bear like referenced numerals. The initializing circuit I includes a 3 input NAND gate 101 electrically connected to the output conductor 50 from the differentiator D over a conductor 102. A conductor 103 electrically connects another input of the NAND gate 101 to the conductor 150. A time delay circuit 104 is electrically connected to the output of the NAND gate 101. The time delay circuit 104 is electrically connected to each of the J, C and K inputs of a J–K flip-flop 105, serving as the output circuit O. The output of the time delay circuit 104 is further provided over a conductor 106 to the third input of the 3 input NAND gate 101. Accordingly, an output pulse from the time delay circuit 104 causes the flip-flop to trigger and change state from the preceding state after the time delay of the time delay circuit 104.

The output conductor 50 from the differentiator D is furnished to an S input of the flip-flop 105 overriding any input signals to the J, K or C input from the time delay element 104, setting the Q output terminal of the flip-flop 105 and the output clock signal A to logic L. In a like manner, the output conductor 150 from the differentiator D–1 is connected to the R, or reset, input terminal of the flip-flop 105, causing the occurrence of a signal on the conductor 150 to override the inputs from the time delay 104 and drive the Q output terminal of the flip-flop 105 to logic 0 level, resetting the output circuit O. The NAND gate 101 of the initializing circuit I triggers the flip-flop 105 upon the occurrence of an output signal from the output conductors 50 or 150.

The time delay circuit 104 forms an output pulse somewhat longer than the pulses formed in the time delay circuits 19 and 24 of the clock element E, and accordingly, in normal operation, the control signals over the conductors 50 and 150 alternately set and reset the flip-flop 105 by means of pulses formed by the time delay 104 and cause the output clock signal A to alternate between the logic levels 1 and 0, respectively. In the event that neither of the output signals on the conductors 50 and 150 have changed the state of the flip-flop 105 before the transitions on the pulse formed in the time delay circuit 104, a connection is provided to cause such flip-flop to "toggle," or reverse logic levels. The pulse causing the flip-flop to toggle is furnished over a conductor 106 to the NAND gate 101.

Upon initialization, the clock elements E when initially energized will accordingly begin to alternate between output states at a frequency controlled by the time delay of the circuit 104. The initializing circuit I accordingly causes the output clock signal A to alternate at such frequency until sufficient of the clock elements E are brought within synchronism with each other to cause the quorum logic circuits L in each of the elements E to begin the operation set forth hereinabove, causing the normal operation of the apparatus A.

An alternative clock element E–1 of the present invention is free-running upon initialization. In the clock elements E–1, like structure to that of the clock element E bears like referenced numerals. The quorum logic circuit L–1 of the clock element E–1 forms the quorum change functions $Q_3^4-$, $Q_2^4+$, $Q_3^4+$, $Q_2^4-$ in accordance with the equations set forth with respect to the quorum logic circuit L of the clock element E, in the manner set forth above.

In a like manner, the quorum change function $Q_2^4-$ and $Q_3^4-$ are formed in the quorum logic circuit L–1 in the clock element E–1. The quorum change functions are furnished as inputs to an OR gate 200. The OR gate 200 passes any of the quorum change functions appearing as inputs thereto to a time delay circuit 201 of conventional construction, of like function to the time delay circuits 19, 24 and 104 set forth above. The time delay circuit 201 forms an output pulse which is furnished to a trigger input T of the triggerable R-S flip-flop in the output circuit O. The time delay circuit 201 further provides an input to the OR gate 200. The quorum change function $Q_2^4+$ is provided to an S input of the output circuit O, causing the output clock signal A to assume the logic 1 level. In a like manner, the quorum change function $Q_3^4-$ is provided over the conductor 150 to the output circuit O, causing the output clock signal A to change to the logic 0 level. The output circuit O of the clock element E–1 thus alternates between logic levels in response to the control signals over the conductors 50 and 150, and is triggered to change states after a time delay caused by the time delay network 201.

The foregoing disclosure and description of the invention are illustrative and explanatory thereof, and various changes in the size, shape, materials, components, circuit elements, wiring connections and contacts as well as in the details of the illustrated circuitry and construction may be made without departing from the spirit of the invention.

We claim:

1. A fault tolerant clock apparatus for providing a digital clock signal despite a number $r$ of failures of individual clock elements thereof, said apparatus comprising:

a plurality of $n$ individual clock elements connected to each other to receive output clock signals from all of said plurality of clock elements, each of said clock elements including quorum logic means for forming control signals responsive to transitions between digital logic levels in the output signals of a controlling minority of a number $x$ of said individual clock elements, output means comprising bistable digital logic means electrically connected to said quorum logic means for forming the digital clock signal in response to the control signals from said quorum logic means wherein the clock signal is formed despite failure of individual clock elements in the clock apparatus, said quorum logic means forming a first of said control signals for setting the output bistable logic means to a first logic level in response to transitions in logic level of the controlling minority $x$ of individual clock elements and said quorum logic means forming a second of said control signals for resetting the output bistable logic means to the second logic level in response to transitions in logic levels of an integral number $y$ of clock elements wherein $r$, $n$, and $x$ are positive integers, $x$ is equal to or greater than $r+1$, $n$ is equal to or greater than $3r+1$, and $y$ is equal to or less than $n-r$.

2. The structure of claim 1, further including:

differentiator means coupled to receive the output control signals from said quorum logic means for forming impulse signals from the control signals from said quorum logic means, said differentiator means activating said output means to form the clock signal.

3. The structure of claim 1, further including:

means coupled to said quorum means for initializing the clock elements on starting of the clock apparatus.

4. The structure of claim 3, wherein said means for initializing comprises:

means for causing a change in the output from said output means in response to a predetermined time lapse with no change in the output from said output means.

5. The structure of claim 3, wherein said means for initializing comprises:

time delay means for causing a change in the output from said output means a predetermined time interval after the preceding change.

* * * * *